3,817,862
METHOD FOR TREATING WASTE WATERS
Bert Hoke, Essen, Germany, assignor to Fried. Krupp
Gesellschaft mit beschrankter Haftung, Essen, Germany
Filed Oct. 18, 1971, Ser. No. 190,255
Claims priority, application Germany, Oct. 16, 1970,
P 20 50 874.1
Int. Cl. C02b *1/34, 3/08*
U.S. Cl. 210—63                               6 Claims

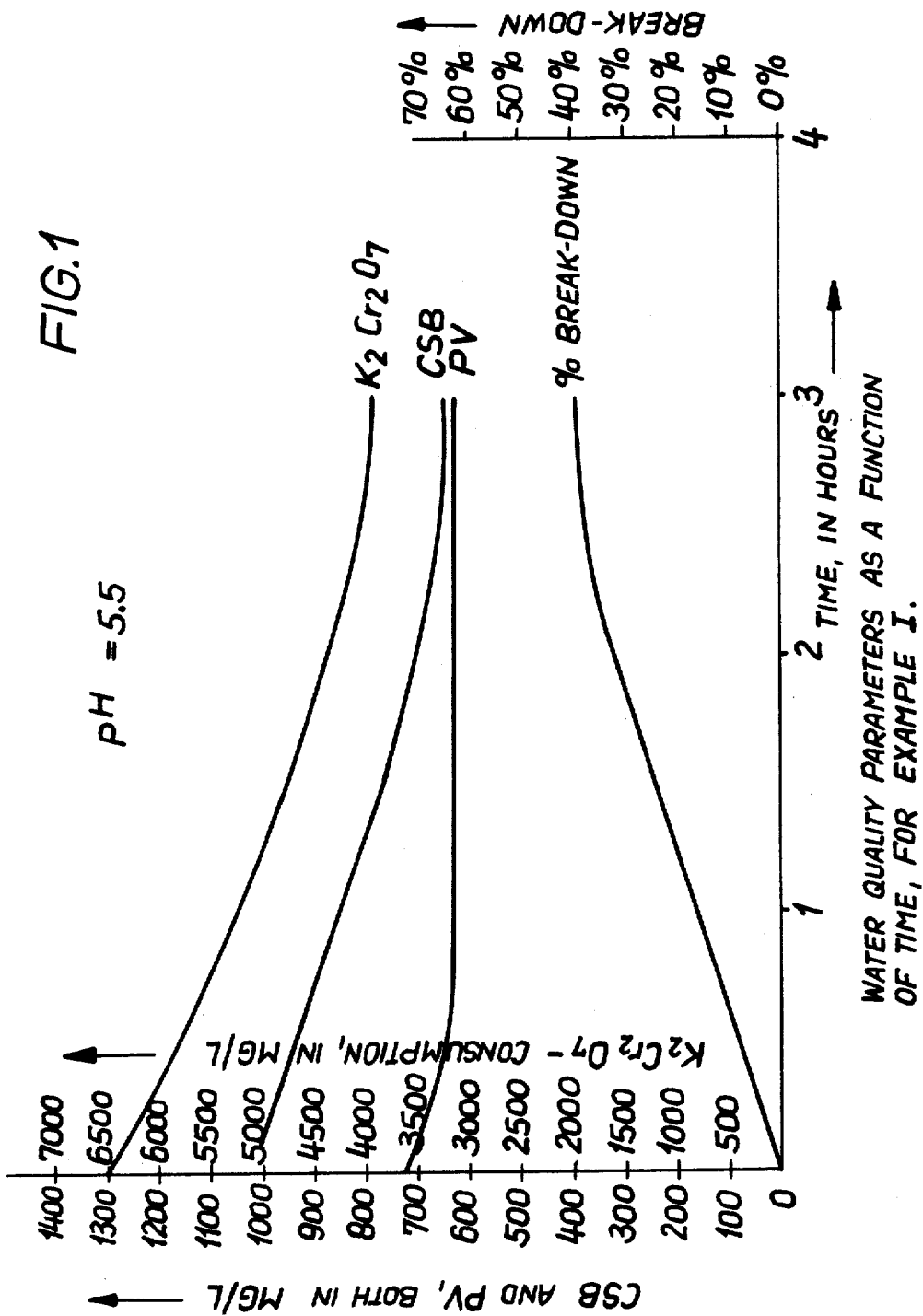

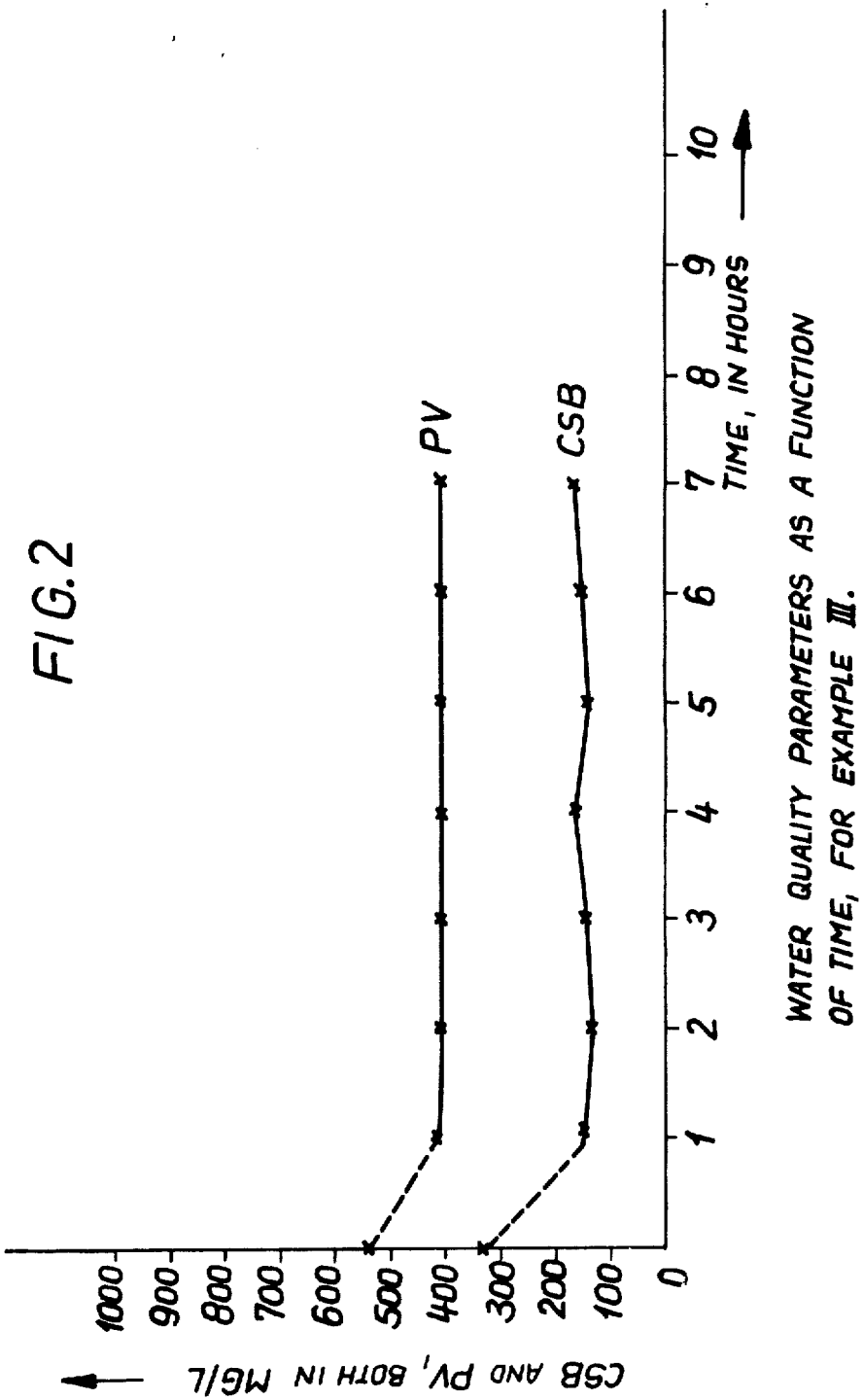

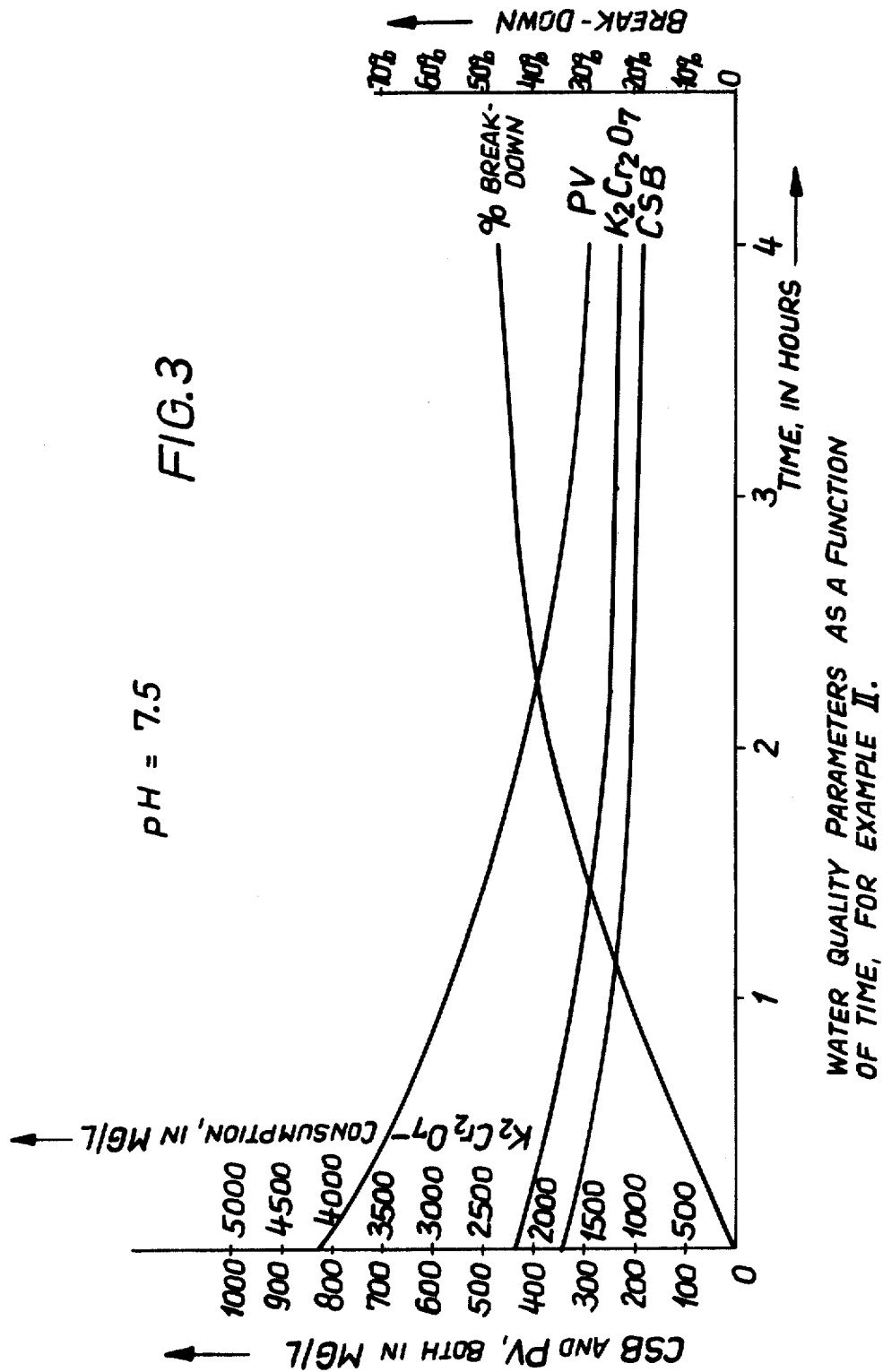

ABSTRACT OF THE DISCLOSURE

A method for treating waste waters containing emulsified and dissolved, oxidizable, organic substances which are free of cyanide, nitrite, hydrazine, dimethyl hydrazine, and nitrogen tetroxide. Waste water is added to carbon or ion exchangers serving as a catalyst and the interfacial area between the air and the resulting mixture of waste water and catalyst is increased.

BACKGROUND OF THE INVENTION

The present invention relates to a method for treating the waste waters from the paper, leather, textile, cleaning, food, and plastics industries, containing emulsified and dissolved, oxidizable, organic and possibly inorganic (such as $H_2S$) substances and being substantially free of cyanides, nitrite, hydrazine, dimethyl hydrazine, and nitrogen tetroxide (Aerozin).

Such waters are contaminated by a multitude of chemical substances, such as organic acids, esters, alcohols, aldehydes, ketones, phenols, phenol derivatives, solvents, disperse dyes, acid dyes, metal-complex dyes, printing dyes, wetting agents, sulfites, and sulfides, as well as nitrogen compounds and the like. Such waters, because of the ability of their contaminants to overload the accommodating capacity of the natural waters must necessarily first be subjected to thorough cleaning and detoxification before being released.

Besides mechanical cleaning processes for such dirtied waters, it is also known to use chemical treating processes, as well as biological clarification methods. In the case of waters contaminated with organic substances, the predominant method to this time has been biological treatments involving an imitating in specially built plants of the biological processes occurring in nature for breaking down the contaminants. The moving factor of these break-down processes are biological microorganisms that change the organic contaminants dissolved in the water into substances forming parts of their life processes, thus extracting the organic contaminants from the water. These break-down processes require oxygen, and, as a consequence, the so-called biochemical oxygen demand (BSB 5) is the commonly used measure for the degree of contamination of waste waters.

Because of the ever-increasing contamination of waste waters, which are overloaded with organic contaminants and/or in which troublesome by-products of "toxic" nature are present, biological treatment processes are becoming either almost without effect or else extremely expensive. Furthermore, unavoidable disturbing factors can arise which are inherent in the biological processes. Moreover, an end product of these biological processes is a sludge whose amount grows with increased contamination in the waters to be treated. In order to get rid of this sludge expensive auxiliary equipment is required, such as sludge drying beds, digesting towers, clarification devices, filter presses, and the like.

SUMMARY OF THE INVENTION

An object of the present invention, therefore, is to provide a process for detoxification and cleaning of waters contaminated with emulsified and dissolved, oxidizable, organic and possibly inorganic ($H_2S$) substances.

Yet another object of the present invention is to provide a process for treating such waters efficiently and with only small labor and chemical costs.

A further object of the present invention is to provide a water-treating process which is much less expensive, requires less time, and operates more reliably than the known biological processes.

These as well as other objects which will become apparent in the discussion that follows are achieved, according to the present invention, by adding waste water to catalyst selected from the group consisting of carbon and ion exchanges, and forcing air through the resulting mixture of waste water and catalyst. The forcing of air through the mixture has the function of increasing the interfacial area between the air and the resulting mixture of waste water and catalyst over the interfacial area resulting when the mixture is at rest with simply its upper liquid surface lying in and forming the air-mixture interface.

BRIEF DESCRIPTION OF THE DRAWINGS

FIGS. 1 to 3 are graphs showing test results for the present invention.

DESCRIPTION OF THE PREFERRED EMBODIMENTS

A preferred catalyst for the method of the present invention is activated carbon. However, porous to microporous ion exchangers can be used, it being preferred to use macroporous ion exchangers which sorb organic substances.

When using activated carbon as catalyst, it is preferred to limit its quantity to a maximum of 20 weight-percent, as based on the weight of waste water in the mixture, and to filter the catalytically oxidized product through an activated carbon filter.

It has been discovered that these catalysts cause the catalytic oxidation of the contaminants in the waste waters from the paper, leather, textile, cleaning, food, and plastics industries. Catalytic oxidation has already been proposed for detoxifying waters loaded with hydrazine, dimethyl hydrazine, nitrogen tetroxide, and cyanide. It was, however, surprising and unexpected that such a method also leads to the complete detoxification and cleaning of waters contaminated with emulsified and dissolved organic substances of the above-named types.

Catalytic oxidation for the cleaning of the named types of waste waters has been discovered to proceed without pH-adjustment and independently of temperature/load ratios or bacteria poisons. Thus, labor and chemical costs for this process are extremely small. Moreover, there is the advantage that living microorganisms do not have to be specially tended. Another advantage as compared with the biological process resides in the fact that a break-in time of weeks and months is not required. A certain amount of mechanical wear of the catalyst does occur in the present invention, but the resulting fine particles can be easily removed by filter equipment. Actually, this wear is desired in that it provides a cleaning and renewing of catalyst surface.

The following examples are further illustrative of the present invention. Used for measuring the efficiency of the water cleaning were the chemical oxygen demand, which is referred to by the letters CSB, and the permanganate consumption, which is referred to by the letters PV. The chemical oxygen demand (CSB) is equal to the biochemical oxygen demand 20, this being referred to by the symbol $BSB_{20}$; PV is equal to the $KMnO_4$-consumption.

Used as a reaction chamber was an approximately 60-liter plastic tank equipped with six aerating nozzles for increasing the interfacial area between the air and the mixture of waste water and catalyst in the tank. These nozzles were mounted on the floor of the tank and assured a uniform distribution of the air being blown into the water. The feeding of the chamber with waste water during the flow-through tests, such as in Example III, was done using a centrifugal pump, which brought about 15 liters per hour continuously from a storage vessel into the reaction chamber. The inlet pipe opening into the reaction chamber lay below the water level.

Using a second pump, a part of the water could be taken from the floor of the reaction chamber and fed back to the water in the chamber by means of a spray pipe directed at the upper surface of the water. The purpose of this facility was to cope with any strong foaming caused by the aeration. It would additionally be expected to increase the amount of air absorbed in the water by serving the function of increasing the interfacial area between the air and the mixture of waste water and catalyst.

The outlet from the reaction chamber was through a slitted plastic nozzle. In order to remove carbon particles, resulting from catalyst wear, and dyes, the water flowing out of the chamber was allowed to free-fall through an activated carbon filter.

Aeration of the water was done using a controllable laboratory blower, and the air reached the six nozzles from an annular pipe around the tank.

In order to test whether the addition of chlorine would influence the CSB of the water, and destroy the dyes in the water, a sodium hypochlorite solution was added to the waste water.

EXAMPLE I

The reaction chamber was filled with 30 liters of waste water. This waste water was collected at the inlet to a biological clarification plant over a period of 24 hours using a device for giving an average sample of the water running through the inlet during an entire course of production for one day. Activated carbon was used as catalyst. This same activated carbon was kept in the reaction chamber during all subsequent tests, in order to exclude adsorptive phenomena. The weight of the carbon amounted to 1250 grams, which gave a specific loading of 42 grams of carbon per liter of waste water. To increase the effect of the air bubbled through the water and to provide better mixing, a stirrer was installed. Thus, it became quickly apparent that the amount of air required to produce the necessary turbulence in the water was larger than the maximum amount which could be supplied by the laboratory blower. With the stirrer in operation, a better movement of unreacted chemicals toward, and reacted chemicals from, the catalyst surface was provided. The amount of air which was blown into the reaction chamber amounted to about 600 liters per hour at a room temperature of about 22° C. and 350 millimeters chamber depth. The pH value of the resulting mixture of waste water and catalyst was 5.5 and the CSB amounted to about 1000 milligrams per liter. The waste water was aerated in the reaction chamber for 5 hours. At time intervals of 30 minutes, a test sample was withdrawn from the water in the reaction chamber and tested for its permanganate consumption (PV) and its CSB. The test results are shown in FIG. 1. While the $KMnO_4$ consumption sank in the first 30 minutes only from 720 mg./l. to 620 mg./l. as a result of catalytic oxidation and then remained constant, the CSB decreased steadily. After about three hours of aeration, the CSB had decreased around 40% (referred to as a chemical "break-down" of 40% in the contaminants). After the filtration in the activated carbon filter, the water was only faintly colored and was practically free of solids. While the waste water had tended to give enormously strong foaming when undergoing biological treatment, no foaming occurred in the reaction chamber of the present invention, even when the spraying device was shut off. It was found that the addition of sodium hypochlorite resulted in no further change in the CSB and no destroying of the residual color in the water after the catalytic oxidation. Additionally presented in FIG. 1 is the $K_2Cr_2O_7$ consumption for this example.

EXAMPLE II

It being discovered that the CSB of the waste water in Example I could be decreased, it was next desired to determine whether the water could be further improved by the present invention, after having first been subjected to biological treatment. To this end, the reaction chamber was filled with 30 liters of water from the outlet of the final clarification basin. The pH of the water was 7.5. The water had a CSB of 340 milligrams per liter. The potassium permanganate consumption lay at 830 mg./l. The test results are illustrated in FIG. 3. In contrast to the results of Example I, here the catalytic oxidation of the present invention caused the $KMnO_4$ consumption to decrease steadily until after 4 hours a PV of 290 mg./l. had been reached. The CSB decreased in the same time from 340 mg./l. to 180 mg./l., corresponding to a breakdown of 160/340 or almost 50% after 4 hours. As determined by Example I, and also in this Example, the most favorable reaction time lies between three and four hours. After this time, the break-down curves flatten out. This is illustrated, for example, in FIG. 1. The observation that a reaction time of 3 to 4 hours was most favorable for the apparatus and test conditions being used was confirmed by tests with other waste waters. The water of this Example was finally passed through the activated carbon filter to remove catalyst particles. The end product was clear and had a weakly colored appearance. Visibility lay at 45 centimeters. A subsequent treatment of the water with sodium hypochlorite gave, as in Example I, no further reduction of the CSB.

EXAMPLE III

After the batch tests in Examples I and II using the inlet and outlet waters of a biological clarification plant, it was desired to determine the effect of continuous treatment of the outlet water from the clarification plant using the techniques of the present invention. To this end, a larger amount of water, about 100 liters, was collected at the outlet of the plant, in order that ample waste water of constant properties would be available for flowing through the test apparatus. The pH of the water amounted to 7.4, the $KMnO_4$ consumption was 540 mg./l., and the CSB lay at 315 mg./l. By means of a small laboratory pump, this waste water was pumped out of a storage vessel into the reaction chamber at the rate of 15 liters per hour. For a flow-through rate of 15 liters per hour and a chamber volume of 53 liters, a calculated residence time of water in the chamber equal to 3.5 hours is obtained. The specific amount of carbon amounted to 24 grams of carbon per liter of waste water. The loading was consequently almost 50% higher than in the batch tests. Every hour, test samples were collected at the outlet of the reaction chamber and tested for CSB and $KMnO_4$ consumption. The test results are shown in FIG. 2. The break-down values obtained correspond to those already determined in the batch tests. In the case of CSB, break-down values of 45 to 53% were obtained. The samples were collected before the activated carbon filter, but the filtering changed the CSB only slightly. The content of permanganate-consuming substances, however, in contrast to the results obtained in Example II, decreased only around 20%. It was further determined whether addition of sodium hypochlorite solution could provide an improvement of the water quality. With the addition of hypochlorite solution up to a concentration of 3 mg./l. free chlorine, only a slight reduction of the CSB was noted. In an available sludge treating plant using microorganisms, final parameters of CSB and PV were reached after *five days* of treatment, in contrast to the reaching of the same final parameters after only *four hours* of treatment with the method of catalytic oxidation according to the present invention. This provided a direct comparability of the effectiveness of the present invention vis-à-vis a commonly used method of today.

EXAMPLE IV

Another series of tests was carried out using the waste waters from a sauerkraut factory. The test conditions were the same as in Example I, except that no addition of sodium hypochlorite was used. In order to prevent fermentation during the test time, the waste water was brought to a pH of about 10 using milk of lime. The CSB in the raw water lay at 44,000 mg./l. and the PV at 96,000 mg./l. In 12 hours, these had decreased to 7400 mg./l. for the CSB and 19,800 mg./l. for the $KMnO_4$ consumption. The break-down was thus about 83%.

EXAMPLE V

Here, the waste water from a laundry for the ink-soiled cloths from a printing shop was treated. This water was contaminated with the dyes, solvents and wetting agents typical for printing shops. The test set-up as set forth in Example I was used. The waste water, which had a dark-red to black color, had a pH of 8. The CSB amounted to 6250 mg./l. and the PV was 2500 mg./l. In 10 hours of treatment, these quantities were as follows:

CSB=580 mg./l.; PV=240 mg./l.

The break-down was thus about 89.5%.

EXAMPLE VI

Using the same experimental set-up as described for Example I, the waste water from a chemical factory for the manufacture of textile impregnating agents was treated. Because of the high oil content, a precipitation (flocculation) with milk of lime, followed by a sedimentation, was carried out before the catalytic oxidation. The raw water had a CSB of 7400 mg./l. The clarified water present after the precipitation and sedimentation had a CSB of 5200 mg./l. and a PV of 7600 mg./l. After catalytic oxidation with aeration over a period of 4 hours under the conditions as in Example I, the CSB had sunk to 1200 mg./l., which corresponds to a 78% decrease. With reference to the raw, unclarified water, this represents a decrease of 84%. The water was then subjected again to catalytic oxidation, for another 3 hours, which brought the CSB down another 300 mg./l., i.e., the CSB sunk from 1200 to 900 mg./l.

EXAMPLE VII

In the same experimental set-up as described for Example I, the waste water from a leather factory was treated by the catalytic oxidation method of the invention. The original CSB was 1700 mg./l. and the original PV equaled 1800 mg./l. After an oxidation period of four hours, the following values were measured:

CSB=220 mg./l.; PV=383 mg./l.

This corresponds to a CSB decrease of 87%.

EXAMPLE VIII

The waste water from a laundry for cloths used for cleaning machinery was first treated in an emulsion-breaking plant. In this way, the CSB of the water was reduced from 9900 mg./l. to 1200 mg./l. After an aeration period of 4 hours under the experimental conditions of Example I, the CSB decreased to 450 mg./l. If only two hours aeration time was used, the CSB was 570 mg./l.; with an aeration period of only one hour, the resulting CSB was 660 mg./l.

In all of Examples I to VIII, the same activated carbon was used, except that after every experiment a catalyst wear of about 5 to 10% by weight was compensated for by the addition of an appropriate quantity of new carbon.

In all experiments, the present invention yielded very good results. In a comparison with a biological treating operation run in parallel with the treatment of the present invention, the same break-down effect was achieved with the present invention that took days to obtain with the biological treatment.

Along with small operational costs, only a fraction of the investment required for biological treating plants is required for the present invention.

Moreover, because the process of the present invention relies purely on chemical action and not on the action of living organisms, the troublesome stoppages met in even the best biological processes are avoided.

EXAMPLE IX

The waste water from a plant processing and coloring animal skins was treated according to the present invention in the manner described below. This water had a dark red appearance when diluted. Undiluted it was black and could not be seen through. In its undiluted state, its CSB was 1200 mg./l. The undiluted water was mixed with powdered activated carbon in the ratio of 300 grams of carbon per cubic meter of water. The resulting mixture was then allowed to fall through a cooling tower utilizing a countercurrent air draft. The fill of the tower was designed to prevent its collecting dirt. After passing through the tower, the water was taken from the collecting basin and pumped back to the top of the tower. A portion of this recirculated water equal to the amount of water coming into the mixing basin was directed off to a filter, with the filtrate being passed to a drainage ditch. The carbon-powder sludge collecting in the filter was recirculated, with less than 5% loss, back into the mixing basin before the top of the tower. A stirrer provided for good mixing of waste water and carbon in the mixing basin. The waste water, originally strongly loaded with wetting agents and dyes as well as other organic contaminants, left the filter clear and colorless, it did not foam, and its CSB lay at at 300 mg./l. Due to the quantity of water recirculated by the pump from the collecting basin back to the top of the tower, a theoretical aeration time of 4 hours was calculated.

EXAMPLE X

In this Example, a series of tests was carried out wherein Examples I–IX were varied by replacing the activated carbon by ion exchanging materials as catalysts. Significant reductions in the CSB and PV were obtained in each case; in most of the cases, the results corresponded to those obtained with the activated carbon catalyst. In decoloring, the ion exchanging materials had to be changed more often and regenerated. The CSB values obtained were in each case within the values prescribed for the treatment of the particular waste waters.

It will be understood that the above description of the present invention is susceptible to various modifications, changes and adaptations, and the same are intended to be comprehended within the meaning and range of equivalets of the appended claims. In the Examples I to IX described above, activated carbon was used in the form of carbon particles in sizes from 1 to 4 mm. or in the form of carbon powder in particles sizes below 0.3 mm., preferably from 0.1 to 0.3 mm., as supplied by the Japanese firm of Shirasagi, Osaka, under the type designations SLW. In Example IX activated carbon powder was used exclusively as catalyst. The different types can be used as mixtures.

In Example X, the ion exchange material used was the resinous adsorbent supplied by the German firm of Bayer AG, Leverkusen, under the trade name Lewatit MP 500 A.

The stirrers used in the examples mentioned above were so-called ships propellers as well as simple bladed propellers, the speed of which was varied from 100 r.p.m. to 1500 r.p.m. The diameter of these propellers amounted from 60 to 100 mm. Two-blade as well as six-blade propellers were used. It was found, however, that the stirring speed exerted no influence on the reaction rate of the floated catalyst.

I claim:

1. A method for treating waste waters containing emulsified and dissolved, oxidizable, organic substances and being free of cyanide, nitrite, hydrazine, dimethyl hydrazine, and nitrogen tetroxide, comprising the step of admixing such waste water with activated carbon as an oxidation catalyst, a step of injecting air into said waste water at a plurality of points for turbulently mixing said waste water and said carbon and increasing the interfacial area between said air and the resulting mixture of waste water and catalyst, said carbon being present in the mixture to a maximum of 20% by weight as based on the weight of the waste water, discontinuing treatment when the chemical oxygen demand and permanganate consumption values have been substantially reduced, and then filtering the treated mixture.

2. A method as claimed in claim 1, wherein the step of injecting air and increasing the interfacial area comprises the circulating of said mixture through a cooling tower.

3. A method as claimed in claim 1, wherein the air is blown in six pathways through said mixture.

4. A method as claimed in claim 1, wherein the waste water is mixed with the activated carbon and the mixture is passed downwardly in counter-current flow to the air.

5. A method as claimed in claim 4, wherein the activated carbon is separated from the treated waste water and recirculated in admixture with waste water to be treated.

6. A method as claimed in claim 1 wherein the treated mixture is filtered through a bed of activated carbon.

References Cited

UNITED STATES PATENTS

| | | | |
|---|---|---|---|
| 3,029,201 | 4/1962 | Brown et al. | 210—63 X |
| 3,029,202 | 4/1962 | Brown | 210—63 |
| 3,455,820 | 7/1969 | Joyce et al. | 210—40 |

OTHER REFERENCES

Pearl, I. A., et al., Catalytic Oxidation, Etc., Ind. and Eng. Chem., vol. 34, 1942, pp. 436–438.

SAMIH N. ZAHARNA, Primary Examiner

P. A. HRUSKOCI, Assistant Examiner

U.S. Cl. X.R.

210—39